United States Patent
Kobayashi

(10) Patent No.: US 12,292,106 B2
(45) Date of Patent: May 6, 2025

(54) STRAIN WAVE GEARING

(71) Applicant: HARMONIC DRIVE SYSTEMS INC., Tokyo (JP)

(72) Inventor: Masaru Kobayashi, Azumino (JP)

(73) Assignee: HARMONIC DRIVE SYSTEMS INC., Tokyo (JP)

( * ) Notice: Subject to any disclaimer, the term of this patent is extended or adjusted under 35 U.S.C. 154(b) by 0 days.

(21) Appl. No.: 18/699,493

(22) PCT Filed: Nov. 5, 2021

(86) PCT No.: PCT/JP2021/040850
§ 371 (c)(1),
(2) Date: Apr. 8, 2024

(87) PCT Pub. No.: WO2023/079701
PCT Pub. Date: May 11, 2023

(65) Prior Publication Data
US 2024/0410457 A1  Dec. 12, 2024

(51) Int. Cl.
*F16H 49/00* (2006.01)
(52) U.S. Cl.
CPC .................................. *F16H 49/001* (2013.01)
(58) Field of Classification Search
CPC .................................................... F16H 49/001
See application file for complete search history.

(56) References Cited

U.S. PATENT DOCUMENTS

2017/0254404 A1* 9/2017 Kobayashi ............ F16H 49/001
2020/0284332 A1   9/2020 Kobayashi

FOREIGN PATENT DOCUMENTS

| JP | H05-332403 A | 12/1993 |
| JP | 2006-200733 A | 8/2006 |
| WO | 2016/084235 A1 | 6/2016 |
| WO | 2018/025297 A1 | 2/2018 |

OTHER PUBLICATIONS

PCT/ISA/210, "International Search Report for PCT International Application No. PCT/JP2021/040850," Jan. 18, 2022.

* cited by examiner

*Primary Examiner* — Terence Boes
(74) *Attorney, Agent, or Firm* — Kreative IP Management LLC; Fuiyeong Kim

(57) ABSTRACT

A strain wave gearing includes a wave generator that creates a state in which a flexible externally toothed gear is flexed into a non-circular shape and partially meshes with a rigid internally toothed gear, and that includes a wave plug having a non-circular outer peripheral surface and a wave bearing attached to the non-circular outer peripheral surface of the wave plug. The wave bearing includes an outer ring having an inner peripheral surface and an outer-ring-side raceway surface formed on the inner peripheral surface, an inner ring having an outer peripheral surface and an inner-ring-side raceway surface formed on the outer peripheral surface, and a plurality of rolling elements rotatably inserted between the outer-ring-side raceway surface and the inner-ring-side raceway surface.

3 Claims, 1 Drawing Sheet

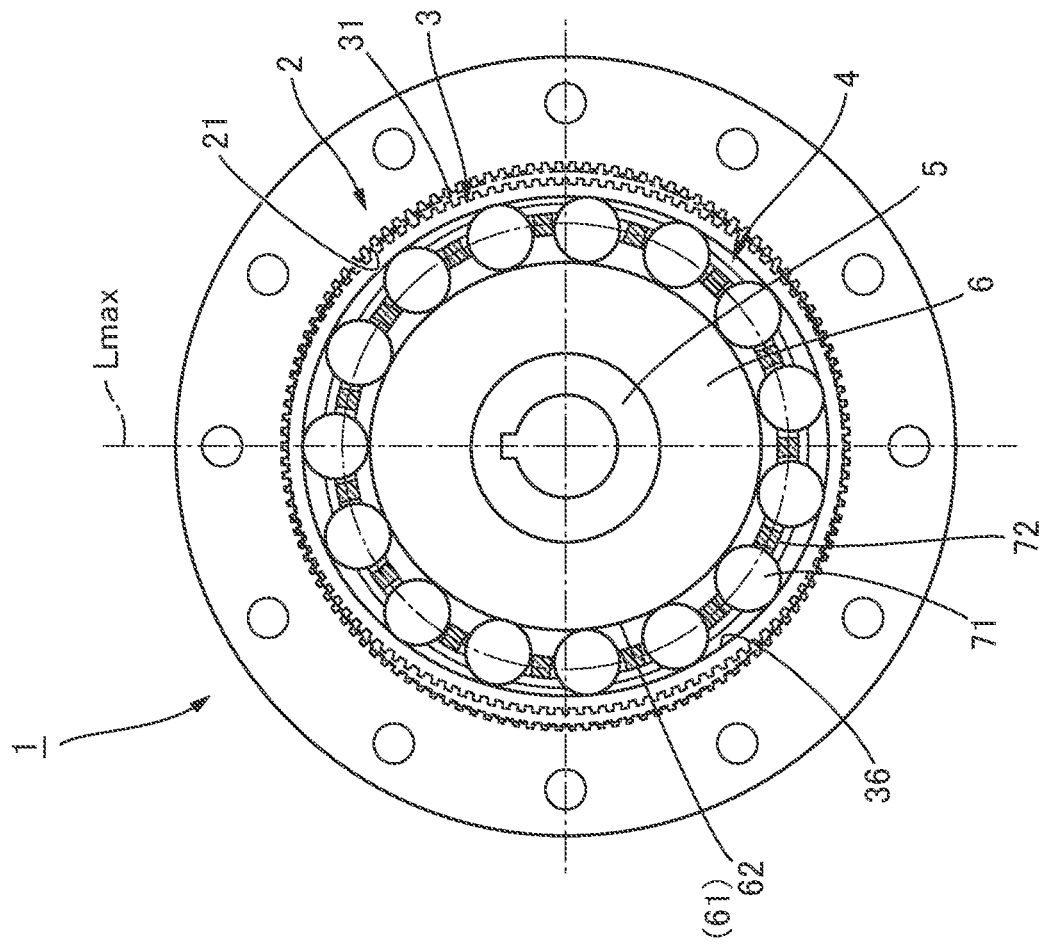
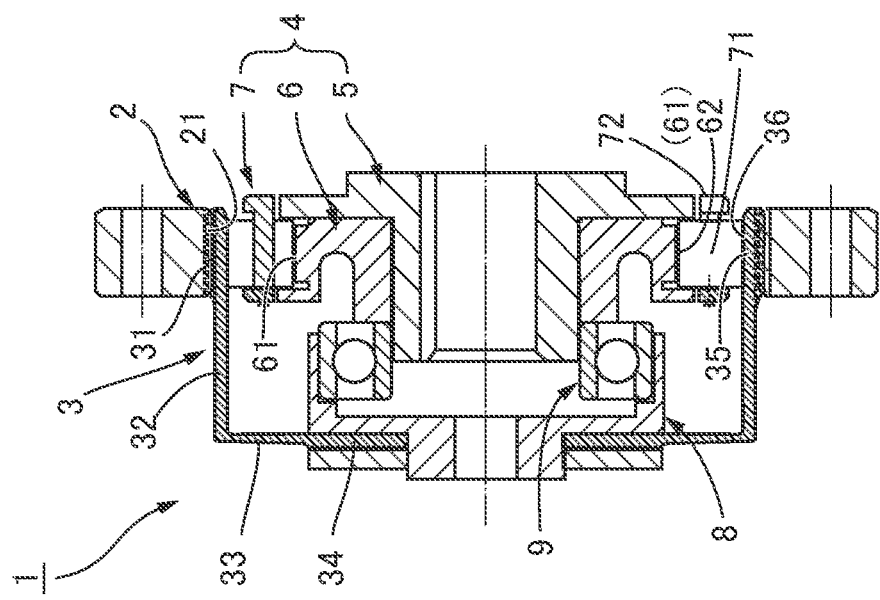

STRAIN WAVE GEARING

CROSS-REFERENCE TO RELATED APPLICATIONS

This application is a national stage entry of International Application No. PCT/JP2021/040850, filed on Nov. 5, 2021, the entire disclosures of which are hereby incorporated by reference herein.-

TECHNICAL FIELD

The present invention relates to a strain wave gearing having a wave generator configured such that a wave bearing is attached to an outer peripheral surface of a wave plug. More specifically, the present invention relates to a strain wave gearing in which raceway parts (inner and outer rings of the wave bearing of the wave generator are made of plastic components.

BACKGROUND ART

A strain wave gearing is constituted of three components: a rigid internally toothed gear, a flexible externally toothed gear, and a wave generator that causes the externally toothed gear to flex in a radial direction and mesh with the internally toothed gear. The wave generator is constituted of a wave plug having a non-circular outer peripheral surface, and a wave bearing attached to the non-circular outer peripheral surface of the wave plug. Attempts have been made to replace metal parts with plastic parts for purposes such as reducing the weight of strain wave gearings that have this configuration. Patent Document 1 proposes a strain wave gearing in which the wave plug, the externally toothed gear, and the internally toothed gear are made of plastic components.

PRIOR ART LITERATURE

Patent Documents

[Patent Document 1] JP H05-332403 A

DISCLOSURE OF THE INVENTION

Problems to be Solved by the Invention

In the prior art, no attention has been paid to using plastic components for raceway parts (outer ring and inner ring), which are constituent components of a wave bearing, in order to reduce the weight of a strain wave gearing.

Thin-bearing-type wave bearings, in which raceway rings are made thinner so that wave motion generated by rotation of a wave plug can be smoothly transmitted to an externally toothed gear, are used as wave bearings for wave generators of strain wave gearings. When the raceway parts (outer ring, inner ring) of a thin-bearing-type wave generator are simply made of plastic components, damage such as dents, wear, and fatigue peeling occurs on the raceway parts even when there is no load or a low load. Even if cylindrical rollers are used as rolling elements, wear and melting will occur in the raceway parts. In addition, even if lubricants and the like are taken into consideration to minimize wear, fatigue peeling of the raceway parts still occurs.

In view of the foregoing, it is an object of the present invention to provide a strain wave gearing having a wave generator with which damage to the raceway parts is avoided and which can be used within a practical load torque range while allowing for weight reduction by making the raceway parts of the wave bearing out of plastic components.

Means for Solving Problems

To solve the problems described above, in a strain wave gearing of the present invention, one or a combination of the following means are adopted so as to reduce stress applied to rolling elements and raceway parts and ensure that damage to the raceway parts does not occur during use in a practical load torque range.

Raceway parts of a wave bearing of a wave generator are formed of a super engineering plastic.

Rolling elements are cylindrical rollers having an appropriate diameter, and an odd number (13 or more) of rolling elements are arranged at equal angular intervals in a circumferential direction.

An amount of flexure (ellipticity) of an externally toothed gear is made greater than a reference amount of flexure.

A pressure angle of external teeth and internal teeth is kept to a low pressure angle of 20 degrees or less.

In the present invention, a strong solid lubricant film (transfer film) made of an ionic crystalline layered compound is formed on raceway surfaces, and grease lubrication is also used, so as to improve fatigue peeling life of raceway parts at a practical load torque.

BRIEF DESCRIPTION OF THE DRAWINGS

FIG. 1A is a schematic cross-sectional view of a strain wave gearing to which the present invention is applied; and FIG. 1B is an explanatory drawing of an externally toothed gear in a state of mesh with an internally toothed gear.

MODE FOR CARRYING OUT THE INVENTION

A strain wave gearing according to an embodiment to which the present invention is applied shall be described below with reference to the drawings. Referring to FIGS. 1A and 1B, a strain wave gearing 1 is provided with an internally toothed gear 2, a cup-shaped flexible externally toothed gear 3 disposed coaxially with and on an inner side of the internally toothed gear, and a wave generator 4 fitted to an inner side of the externally toothed gear. The internally toothed gear 2 and the externally toothed gear 3 are both spur gears of modulus m, and can mesh with each other. The externally toothed gear 3 includes a cylindrical part 32 on which external teeth 31 are formed, a diaphragm 33 extending from one end of the cylindrical part 32 toward the inner side in a radial direction, and a boss disk-shaped 34 formed continuously with an inner peripheral edge of the diaphragm 33. The wave generator 4 is fitted to an inner side of an opening-side portion 35 where the external teeth 31 in the cylindrical part 32 of the externally toothed gear are formed.

The externally toothed gear 3 is caused to flex into an ellipsoidal shape by the wave generator 4, and the external teeth 31 positioned at both ends of a major axis Lmax of the ellipsoidal shape with mesh internal teeth 21 of the internally toothed gear 2. When the wave generator 4 rotates, the positions where the externally toothed gear 3 meshes with the internally toothed gear 2 move in the circumferential direction and relative rotation occurs between the gears 2 and 3, the rotation corresponding to a difference in the number of teeth between the gears. In the present example, because the externally toothed gear 3 is caused to flex into an ellipsoidal shape and meshes with the internally toothed gear 2 at two locations in the circumferential direction, the difference in the number of teeth between the gears 2 and 3 is 2n (n being a positive integer), e.g., 2 and the internally toothed gear 2 has a large number of teeth. In the present example, the internally toothed gear 2 and the externally toothed gear 3 are both plastic components.

The wave generator 4 includes a cylindrical hub 5 having a shaft hole, a wave plug 6 attached to an outer peripheral surface of the hub 5, and a wave bearing 7 attached to an ellipsoidal outer peripheral surface 61 of the wave plug 6. These constituent components of the wave generator 4 are plastic components. In addition, the wave bearing 7 of the present example is a roller bearing and is provided with an outer-ring-side raceway surface 36 formed on an inner peripheral surface of the opening-side portion 35 of the externally toothed gear 3, an inner-ring-side raceway surface 62 formed on the ellipsoidal outer peripheral surface 61 of the wave plug 6, a plurality of cylindrical rollers 71 inserted in a rollable state into a raceway groove formed between the outer-ring-side raceway surface 36 and the inner-ring-side raceway surface 62, and a retainer 72 that holds the cylindrical rollers 71 at equal angular intervals in the circumferential direction. Thus, in the present example, the outer ring of the wave bearing 7 is integrally formed on the opening-side portion 35 of the cylindrical part 32 of the externally toothed gear 3, and the inner ring is integrally formed on the wave plug 6. The outer ring and inner ring of the wave bearing 7 can also be made of independent plastic components.

On the inner side of the externally toothed gear 3, a cup-shaped outer ring holder 8 is coaxially fixed to a boss 34. A ball bearing 9 is attached between the outer ring holder 8 and a shaft end part of the hub 5 of the wave generator 4. The wave generator 4, via the ball bearing 9, is rotatably supported by a portion of the boss 34 of the externally toothed gear 3. The outer ring holder 8 and inner and outer rings of the ball bearing 9 can be made of plastic components.

(Wave Bearing)

The wave bearing 7 of the wave generator 4 shall now be described in further detail. First, the material shall be described. The externally toothed gear 3, on which the outer ring of the wave bearing 7 of the wave generator 4 is integrally formed, and the wave plug 6, on which the inner ring of the externally toothed gear 3 is integrally formed, are both formed of a super engineering plastic. When the outer ring and inner ring of the wave bearing 7 are independent plastic components, at least the outer ring and the inner ring are formed of a super engineering plastic.

Examples of super engineering plastics include the following. Known crystalline resins include polyphenylene sulfide (PPS), polyetheretherketone (PEEK), liquid crystal polymer (LCP), fluorocarbon resin (FR), and the like. Known amorphous resins include polyarylate (PAR), polysulfone (PSU), polyamideimide (PAI), polyetherimide (PEI), thermoplastic polyimide (TPI), and the like. For example, the material of the externally toothed gear 3 with an integrated outer ring and the wave plug 6 with an integrated inner ring can be PEEK, PAI, TPI, or PPS.

As mentioned previously, when the raceway parts of the wave bearing 7 of the wave generator 4, i.e., the components on which the outer-ring-side raceway surface 36 and the inner-ring-side raceway surface 62 are formed are made of plastic, damage such as dents, wear, and fatigue peeling occurs on the raceway surfaces even when there is no load or a low load. In order to provide a wave generator with which damage to the raceway surfaces is avoided and which can be used in a practical load torque e range while allowing for weight reduction, in the present example, the wave bearing 7 is configured as follows.

First, the cylindrical rollers 71 of the wave bearing 7 preferably have a large roller diameter in order to, inter alia, reduce stress acting on the outer-ring-side raceway surface 36 and the inner-ring-side raceway surface 62. In order for the wave motion generated in the externally toothed gear 3 by the rotation of the wave plug 6 of the wave generator 4 to be smoothly transmitted from the wave plug 6 to the externally toothed gear 3, at least a predetermined number of cylindrical rollers 71 are preferably arranged at equal angular intervals in the circumferential direction. In the present example, there are an odd number (13 or more) of the cylindrical rollers 71, and the cylindrical rollers 71 are held by the retainer 72 in positions at equal angular intervals in the circumferential direction. The relationship below must obtain for the necessary number of cylindrical rollers 71 to be arranged, where D is the roller diameter of the cylindrical rollers 71 and PCD is the raceway groove diameter of the wave bearing 7 prior to being flexed into an ellipsoidal shape.

$$D \leq PCD \times 0.2$$

In addition, in the present example, the outer ring thickness, i.e., the opening-side portion 35 of the externally toothed gear 3 with an integrated outer ring is made as great as possible, and the ellipticity (the amount of flexure: df of the externally toothed gear 3) is as follows, regardless of speed ratio.

$$df = \text{difference in number of teeth } (2n) \times \text{modulus } (m) \text{ of teeth}$$

As a result, it is possible to increase load factor (representing a range of a load zone representing load distribution of the rolling bearing) when there is no load, and it is possible to reduce radial load when there is a load.

Furthermore, a pressure angle (or average pressure angle) of each of the teeth of the internal teeth 21 of the internally toothed gear 2 and the external teeth 31 of the externally toothed gear 3 is set to a low pressure angle of 20 degrees or less. As a result, it is possible to reduce radial load when there is a load.

Next, in the wave bearing 7, there is still a risk that wear and melting of the outer-ring-side raceway surface 36 and the inner-ring-side raceway surface 62 will occur even when the rolling elements are the cylindrical rollers 71 as described above. There is also a risk of fatigue peeling of the raceway surfaces even if wear on the raceway surfaces can be minimized by taking lubricants and the like into consideration. In order to reliably avoid such adverse events, it is desirable to form a solid lubricant film made from a fine powder of an ionic crystalline layered compound on the inner-ring-side raceway surface 62 and the outer-ring-side raceway surface 36. Molybdenum disulfide ($MoS_2$), tungsten sulfide ($WS_2$), or the like can be used as the ionic crystalline layered compound. A strong transfer film can be formed as a solid lubricant film on the raceway surfaces by, e.g., causing a fine powder made from such an ionic crystalline layered compound to be applied on the raceway surfaces by shot peening or by buffing with soft leather or the like. This makes it possible to reduce shear stress near the raceway surfaces. In addition, it is possible to reliably prevent wear and melting of the outer-ring-side raceway surface 36 and the inner-ring-side raceway surface 62 by also using grease lubrication.

Other Embodiments

In the above example, the present invention is applied to a cup-type strain wave gearing. The present invention can similarly be applied to the wave generator of a top-hat-type strain wave gearing having a top-hat-shaped externally toothed gear, and of a flat-type strain wave gearing having a cylindrical externally toothed gear.

The invention claimed is:

1. A strain wave gearing comprising:
a wave generator that creates a state in which a flexible externally toothed gear is flexed into a non-circular shape and partially meshes with a rigid internally toothed gear, the wave generator including
a wave plug having a non-circular outer peripheral surface, and
a wave bearing attached to the non-circular outer peripheral surface of the wave plug, and including
an outer ring having an inner peripheral surface and an outer-ring-side raceway surface formed on the inner peripheral surface,
an inner ring having an outer peripheral surface and an inner-ring-side raceway surface formed on the outer peripheral surface, and
a plurality of rolling elements rotatably inserted between the outer-ring-side raceway surface and the inner-ring-side raceway surface,
wherein
each of the outer ring and the inner ring is a component made of a super engineering plastic,
wherein
the plurality of rolling elements is cylindrical rollers arranged at equal angular intervals in a circumferential direction of the wave bearing,
the number of cylindrical rollers is an odd number of 13 or greater, and
a relationship,
$D \leq PCD \times 0.2$
is satisfied, where D is a roller diameter of each of the cylindrical rollers and PCD is a raceway groove diameter of the wave bearing prior to being flexed into the non-circular shape,
wherein
the internally toothed gear and the externally toothed gear are gears having modulus m,
a difference in the number of teeth between the internally toothed gear and the externally toothed gear is 2n, n being a positive integer,
the externally toothed gear is flexed into an ellipsoidal shape by the wave generator, and a relationship,
$df \geq 2n \times m$
is satisfied, where df is an amount of flexure of the externally toothed gear as an ellipticity of the ellipsoidal shape,
wherein
a pressure angle of each of teeth of the internally toothed gear and the externally toothed gear is a low pressure angle equal to or less than 20 degrees, and
wherein
the inner-ring-side raceway surface and the outer-ring-side raceway surface are formed thereon with a transfer film made of fine powder of an ionic crystalline layered compound and are coated with grease.

2. The strain wave gearing of claim 1, wherein
the outer ring is integrally formed on the externally toothed gear, and
the externally toothed gear is a component made of the super engineering plastic.

3. The strain wave gearing of claim 1, wherein
the inner ring is integrally formed on the wave plug, and
the wave plug is a component made of the super engineering plastic.

* * * * *